US012736286B1

(12) United States Patent
Freedman

(10) Patent No.: US 12,736,286 B1
(45) Date of Patent: Sep. 15, 2026

(54) ELECTRODE OVENS AND ELECTRODE HEATING AND DRYING METHODS

(71) Applicant: Robert Freedman, Hammond, LA (US)

(72) Inventor: Robert Freedman, Hammond, LA (US)

(73) Assignee: Henkel Enterprises, LLC, Hammond, LA (US)

( * ) Notice: Subject to any disclaimer, the term of this patent is extended or adjusted under 35 U.S.C. 154(b) by 976 days.

(21) Appl. No.: 17/986,512

(22) Filed: Nov. 14, 2022

(51) Int. Cl.
*F27B 5/14* (2006.01)
*F27B 5/18* (2006.01)

(52) U.S. Cl.
CPC .................. *F27B 5/14* (2013.01); *F27B 5/18* (2013.01); *F27M 2003/08* (2013.01)

(58) Field of Classification Search
CPC .......... B23K 35/404; B23K 9/32; B23K 9/24; F26B 15/00; F26B 15/12; F26B 15/14; F26B 23/001; F26B 3/30; F26B 3/305; F26B 9/003
USPC .................................................. 219/133, 136
See application file for complete search history.

(56) References Cited

U.S. PATENT DOCUMENTS 2,767,100 A * 10/1956 Clarke .................... A47J 47/14 426/418
3,350,535 A 10/1967 Simon
5,266,772 A 11/1993 Reed
6,528,764 B2 3/2003 Podgurski
7,942,266 B2 5/2011 Weissbrod
8,307,981 B1 11/2012 Weissbrod
9,623,510 B2 4/2017 Rozmarynowski et al.
9,700,956 B2 7/2017 Rozmarynowski et al.
2004/0173613 A1* 9/2004 Schroeder .......... B65D 43/0212 220/795
2008/0156783 A1* 7/2008 Vanden Heuvel ... B23K 9/1336 219/137.2
2014/0217078 A1* 8/2014 Rozmarynowski .... B23K 9/327 219/138
2014/0246413 A1* 9/2014 Rozmarynowski ...... B23K 9/32 219/137 PS

OTHER PUBLICATIONS

Yoon, KR 20150107338 (Year: 2015).*
TR 201802486 (Year: 2018).*
Hong, KR 20150135008 (Year: 2015).*

* cited by examiner

*Primary Examiner* — Vy T Nguyen
(74) *Attorney, Agent, or Firm* — R. Keith Harrison

(57) ABSTRACT

Electrode ovens suitable for heating and drying welding electrodes may include an oven housing deployable in open and closed oven configurations. An electrode heating and drying system may be disposed in the oven housing. The electrode heating and drying system may include a hermetically sealable electrode container deployable in open and closed container configurations. The electrode container may be sized and configured to contain at least one welding electrode. At least one heating element may be disposed in the oven housing. The heating element may be disposed in heat-transferring relationship to the electrode container and operable to heat the electrode container.

19 Claims, 9 Drawing Sheets

ELECTRODE OVENS AND ELECTRODE HEATING AND DRYING METHODS

FIELD

Illustrative embodiments of the disclosure generally relate to apparatuses for heating and drying welding electrodes. More particularly, illustrative embodiments of the disclosure relate to electrode ovens and electrode heating and drying methods which are suitable for heating, drying, and maintaining welding electrodes in a heated and dried condition prior to use.

SUMMARY

Illustrative embodiments of the disclosure are generally directed to electrode ovens suitable for heating and drying welding electrodes. An illustrative embodiment of the electrode ovens may include an oven housing deployable in open and closed oven configurations. An electrode heating and drying system may be disposed in the oven housing. The electrode heating and drying system may include a hermetically scalable electrode container deployable in open and closed container configurations. The electrode container may be sized and configured to contain at least one welding electrode. At least one heating element may be disposed in the oven housing. The heating element may be disposed in heat-transferring relationship to the electrode container and operable to heat the electrode container.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
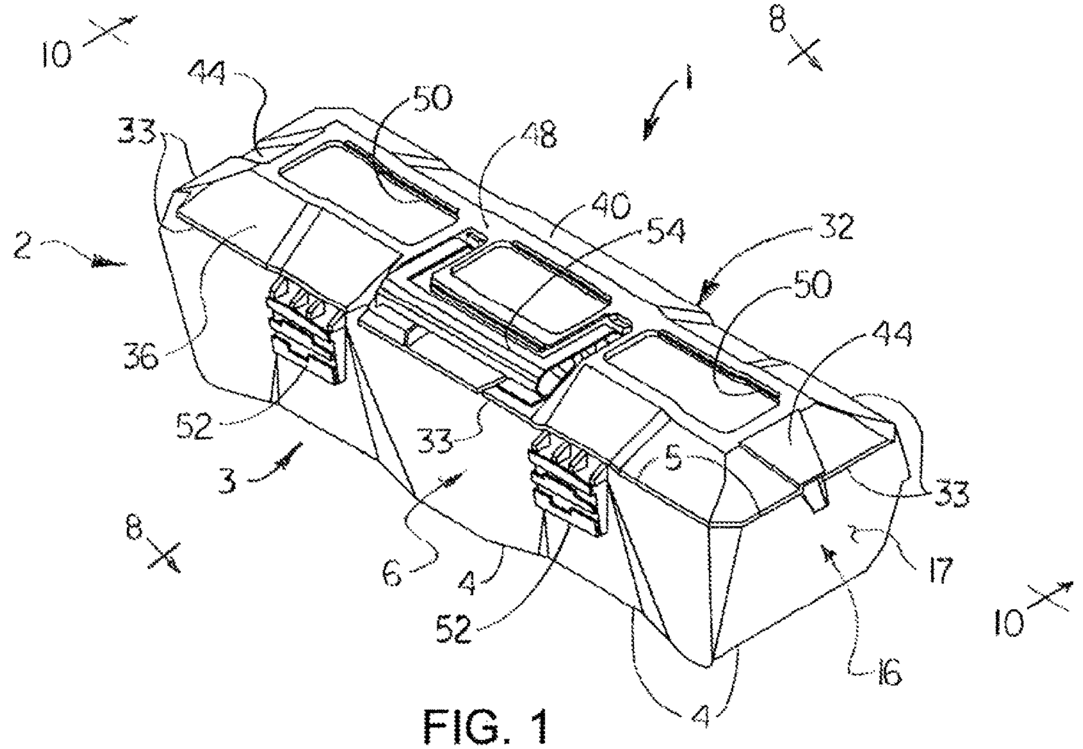
FIG. 1 is a front perspective view of an illustrative embodiment of the electrode ovens of the disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Illustrative embodiments of the disclosure are generally directed to electrode ovens and electrode heating and drying methods which are suitable for heating, drying, and maintaining welding electrodes in a heated and dried condition prior to use. In the arc welding industry, welding electrodes must be conditioned properly prior to use to avoid adverse defects in the welds created using the electrodes. Part of this conditioning process may include heating and drying the electrodes. For example, welding electrodes are manufactured to be within acceptable moisture limits consistent with the type of weld metal to be used with the electrode. Therefore, it is desirable to heat, dry and maintain the electrodes within acceptable moisture ranges prior to use for optimum welding quality purposes.

Referring initially to FIGS. 1-12 of the drawings, an illustrative embodiment of the electrode ovens is generally indicated by reference numeral 1. As illustrated in FIGS. 8-11 and will be hereinafter described, the electrode oven 1 may be suitable for containing, heating, and drying at least one welding electrode 94 and maintaining the welding electrode 94 in a heated and dried condition prior to use. The electrode oven 1 may be particularly suitable for facilitating uniform heat distribution and dissipation of moisture over the entire length of the welding electrode 94 for optimal functioning of the welding electrode 94 during use and enhanced weld quality.

The electrode oven 1 may include an oven housing 2. The oven housing 2 may be selectively deployable in open and closed oven configurations. The open oven configuration of the oven housing 2 may facilitate placement of the welding electrodes 94 therein and removal of the welding electrodes 94 therefrom. The closed oven configuration of the oven housing 2 may facilitate heating and drying of the welding electrodes 94 as well as maintenance or storage of the welding electrodes 94 in the heated and dried condition preparatory to use of the welding electrodes 94.

Figure 8:
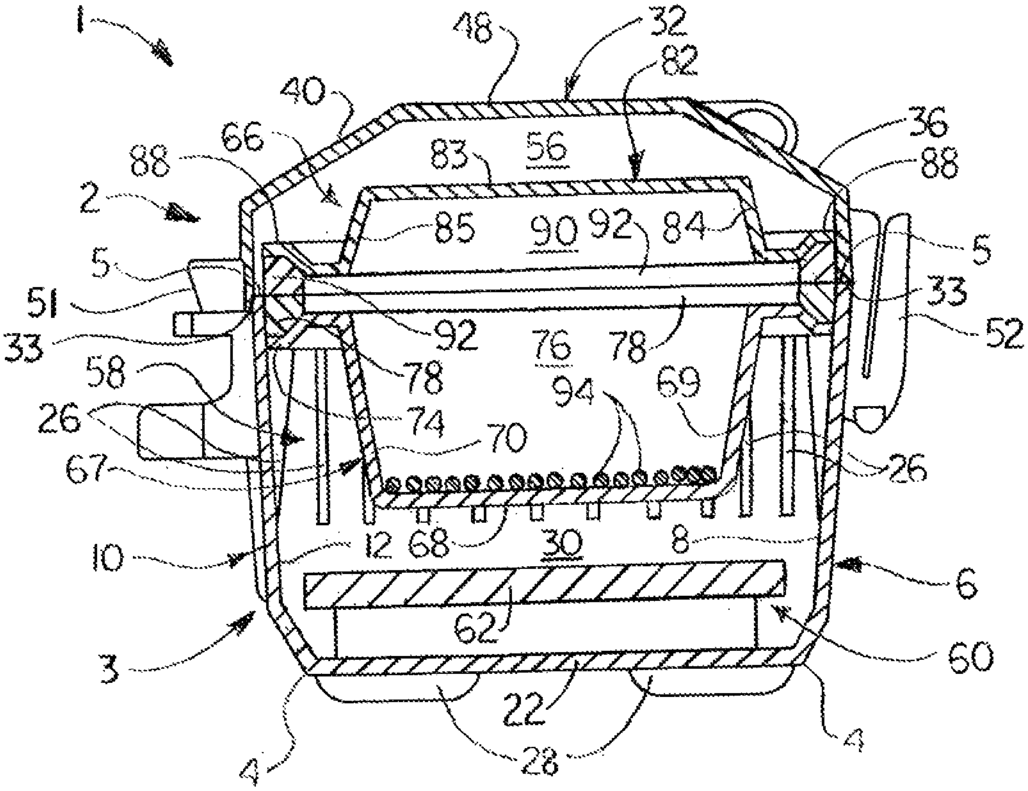
FIG. 8 is a cross-sectional view, taken along section lines 8-8 in FIG. 1, of the illustrative electrode oven with the welding electrodes enclosed in the electrode container of the electrode heating and drying system.
Figure 10:
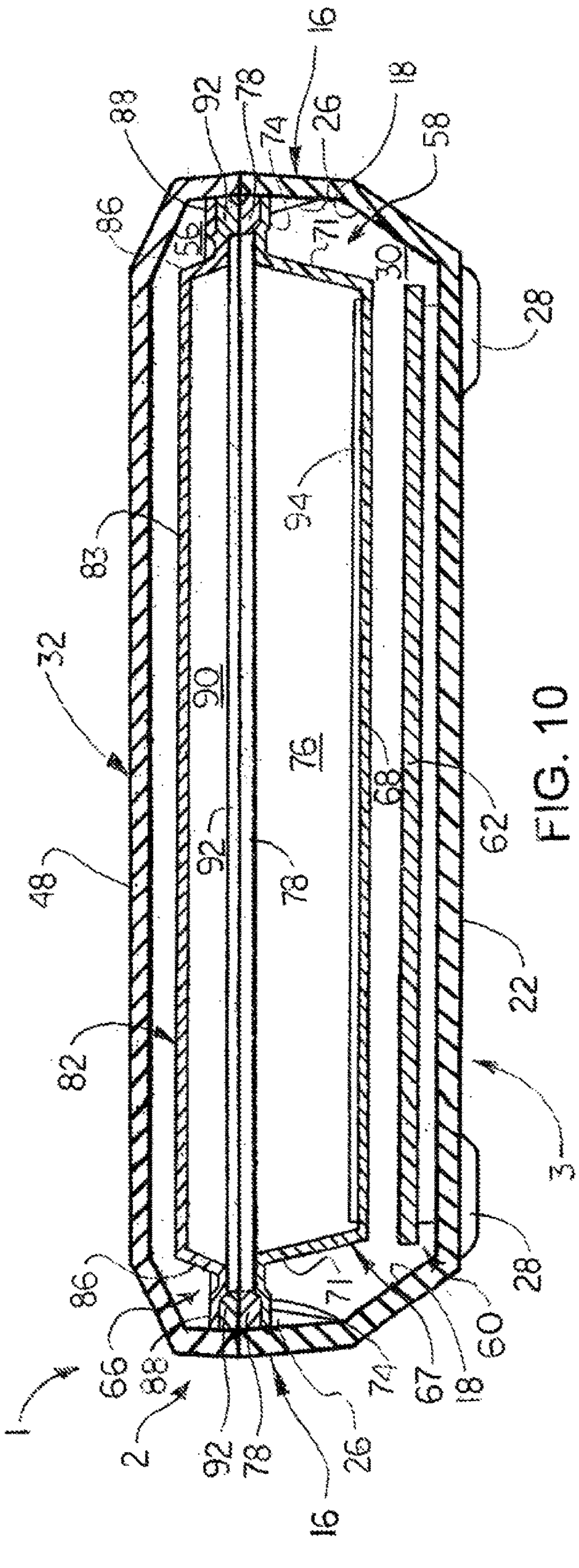
FIG. 10 is a longitudinal sectional view, taken along section lines 10-10 in FIG. 1, of the illustrative electrode oven.

As illustrated in FIGS. 8 and 10, an electrode heating and drying system 60 may be provided in the oven housing 2. The electrode heating and drying system 60 may facilitate heating and drying of the welding electrodes 94 as well as maintenance of the welding electrodes 94 at a desired storage temperature. The electrode heating and drying system 60 may include a hermetically scalable electrode container 66 which is deployable in open and closed container configurations. The electrode container 66 may be sized and configured to contain at least one of the welding electrodes 94. At least one heating element 62 may be provided in the oven housing 2. The heating element 62 may be disposed in heat-transferring relationship to the electrode container 66, typically as will be hereinafter described.

The heating element 62 may include any device, element, or combination of devices and elements capable of imparting thermal energy to the electrode container 66 via conduction, convection and/or radiation. Non-limiting examples of the heating element 62 include electrical resistance wire heating elements or coils, thick film resistance heaters printed on a thin substrate, and polymer PTC heating elements. PTC (Positive Temperature Coefficient) rubber is a silicone rubber which conducts electricity with a resistivity that increases exponentially with increasing temperature for all temperatures up to a temperature in which the resistivity grows to infinity. Above this temperature, the PTC rubber is an electrical insulator. PTC rubber is made from polydimethylsiloxane (PDMS) which is loaded with carbon nanoparticles.

In some embodiments, the heating element 62 may be disposed in the lower portion of the housing base interior 30 such that the heating element 62 is spaced-apart with respect to the container base 67 of the electrode container 66 in the housing base interior 30, as illustrated. This spacing between the heating element 62 and the container base 67 may facilitate heating of the electrode container 66 via radiation or convection. In other embodiments, the heating element 62 may be disposed in direct thermal contact with the electrode container 66 to facilitate heating of the electrode container 66 via conduction.

The oven housing 2 may include a housing base 3. A housing lid 32 may be selectively openable on the housing base 3. In some embodiments, the housing base 3 and the housing lid 32 may be elongated and disposed in a horizontal orientation during use of the electrode oven 1, as illustrated in FIOS. 1 and 2.

Figure 2:
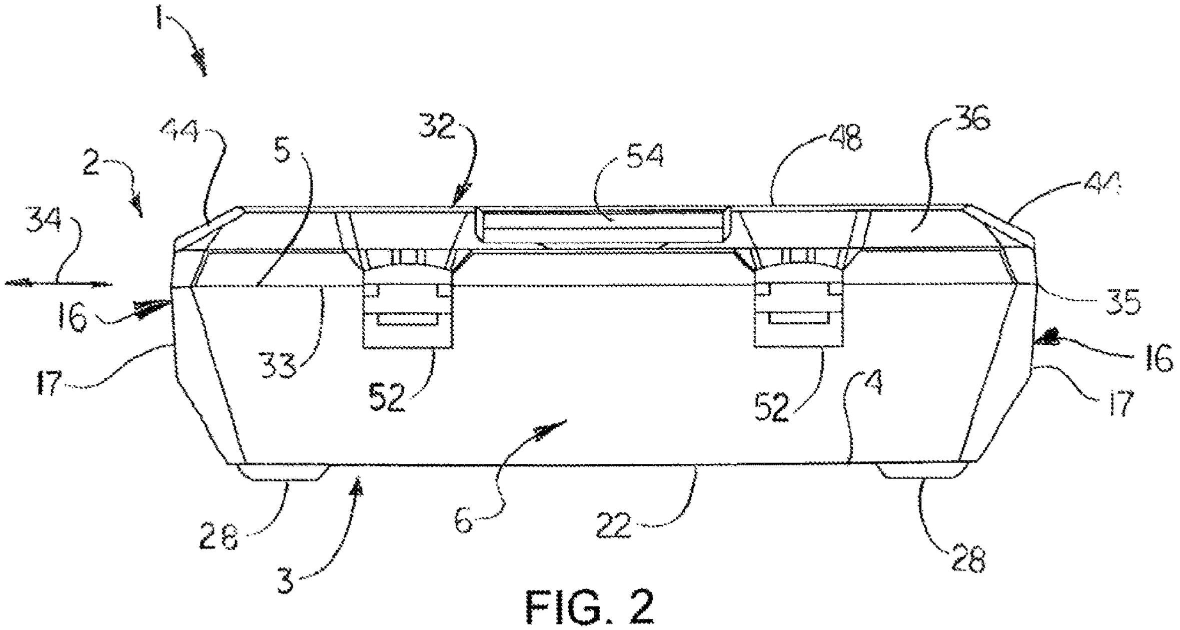
FIG. 2 is a front view of the illustrative electrode oven illustrated in FIG. 1.
Figure 3:
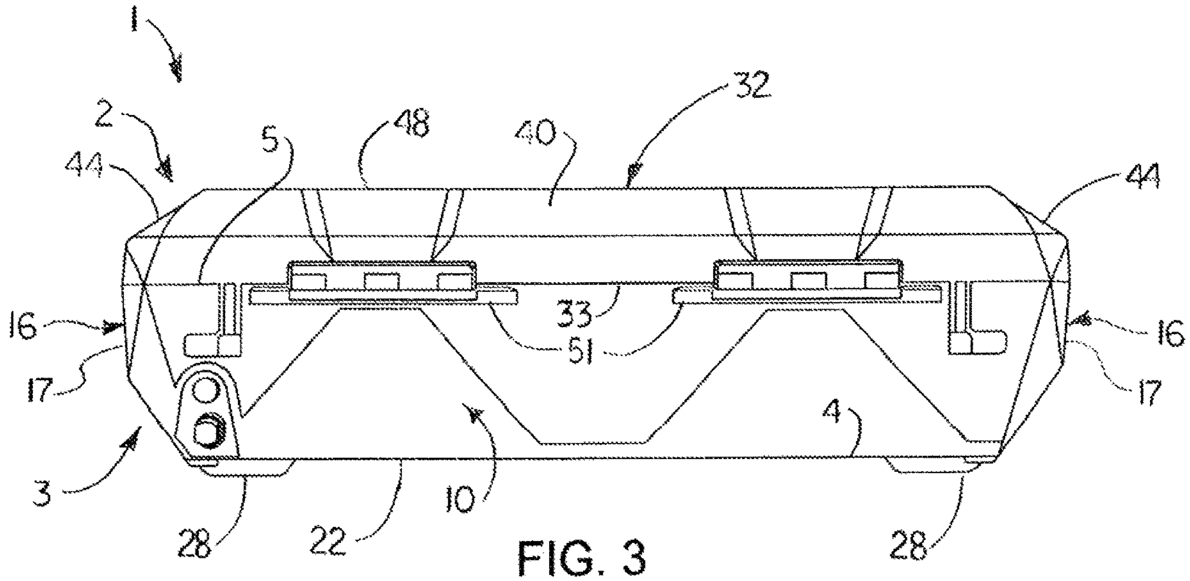
FIG. 3 is a rear view of the illustrative electrode oven.
Figure 4:
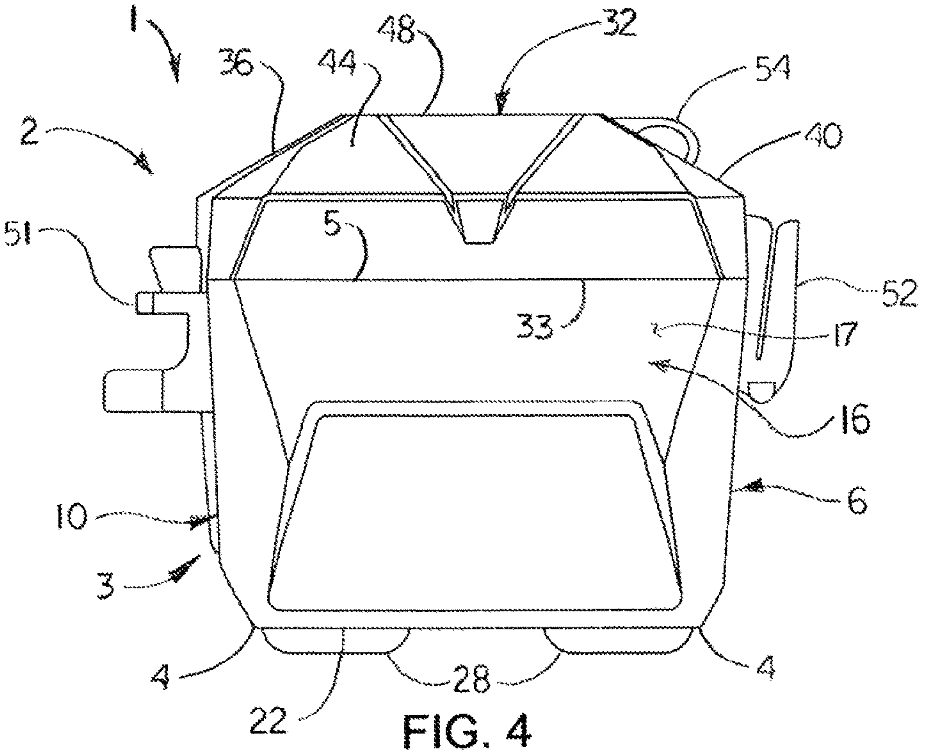
FIG. 4 is a right-side view of the illustrative electrode oven.

The housing base 3 of the oven housing 2 may have an elongated lower base edge 4 and an elongated upper base edge 5. The housing lid 32 may have a lid edge 33. The housing lid 32 may be pivotally attached to the housing base 3 and openable on the housing base 3 along a horizontal lid axis 34 (FIG. 2). Accordingly, as illustrated in FIGS. 3 and 4, at least one lid hinge 51 may pivotally attach the housing lid 32 to the housing base 3 along the lid edge 33 of the housing lid 32 and the upper base edge 5 of the housing base 3. As illustrated in FIGS. 2 and 4, at least one lid latch 52 may detachably or releasably secure the housing lid 32 in the closed oven configuration on the housing base 3. At least one container handle 54 may be provided on the housing lid 32 for the purpose of carrying and transporting the electrode oven 1.

As illustrated in FIG. 1, in some embodiments, at least one lid depression 50 may be provided in the outer or upper surface of the top lid panel 48 of the housing lid 32. As illustrated in FIG. 2, at least one housing foot 28 may extend from the outer or lower surface of the housing base 3. The lid depressions 50 and the housing feet 28 may facilitate stable stacking and storage or transport of multiple electrode ovens 1 on top of each other as the housing feet 28 of an upper electrode oven 1 are inserted into the respective lid depression or depressions 50 of the lower electrode oven 1.

In some embodiments, the housing base 3 of the oven housing 2 may be elongated and rectangular. Accordingly, the housing base 3 may have an elongated, rectangular bottom base panel 22. An elongated front base panel 6 and an elongated rear base panel 10 may extend from the bottom base panel 22. A pair of spaced-apart side base panels 16 may extend from the bottom base panel 22 between the front base panel 6 and the rear base panel 10.

The housing lid 32 of the oven housing 2 may be elongated and rectangular, matching the size and shape of the housing base 3. Accordingly, the housing lid 32 may have an elongated top lid panel 48. An elongated front lid panel 36 and an elongated rear lid panel 40 may extend from the top lid panel 48. A pair of side lid panels 44 may extend from the respective ends of the top lid panel 48 between the front lid panel 36 and the rear lid panel 40. The lid edge 33 of the housing lid 32 may mate with the upper base edge 5 of the housing base 3 when the housing lid 32 is in the closed oven configuration. The lid hinges 51 may pivotally attach the rear lid panel 40 of the housing lid 32 to the rear base panel 10 of the housing base 3. The lid latches 52 may releasably attach the front lid panel 36 of the housing lid 32 to the front base panel 6 of the housing base 3.

As illustrated in FIGS. 8 and 10, the housing base 3 of the oven housing 2 may have a housing base interior 30. The housing lid 32 of the oven housing 2 may have a lid interior 56. When the housing lid 32 is in the closed oven configuration on the housing base 3, the housing base interior 30 and the lid interior 56 may together form a housing interior 58 which contains the electrode container 66.

The housing base 3 and the housing lid 32 of the oven housing 2 may be fabricated of a thermally conductive or insulative material. Non-limiting examples of such material may include aluminum, steel, and/or other metals, plastic and/or composite materials.

The electrode container 66 of the electrode heating and drying system 60 may include a container base 67. The container base 66 may be sized and configured to contain the welding electrode or electrodes 94 for heating and drying of the welding electrodes 94. An openable container cover 82 may sealingly engage the container base 67 in the closed container configuration of the electrode container 66.

In some embodiments, the container cover 82 may be completely removable from the container base 67 in deployment of the electrode container 66 from the closed container configuration to the open container configuration. In other embodiments, the container cover 82 may be pivotally attached to the container base 67 according to the knowledge of those skilled in the art. One or more container clamps (not illustrated) may be deployed to secure the container cover 82 on the container base 67 in the closed container configuration. Alternatively, the container cover 82 may have sufficient weight to rest on the container base 67 and form a hermetic seal with the container base 67 solely by gravity.

Figure 5:
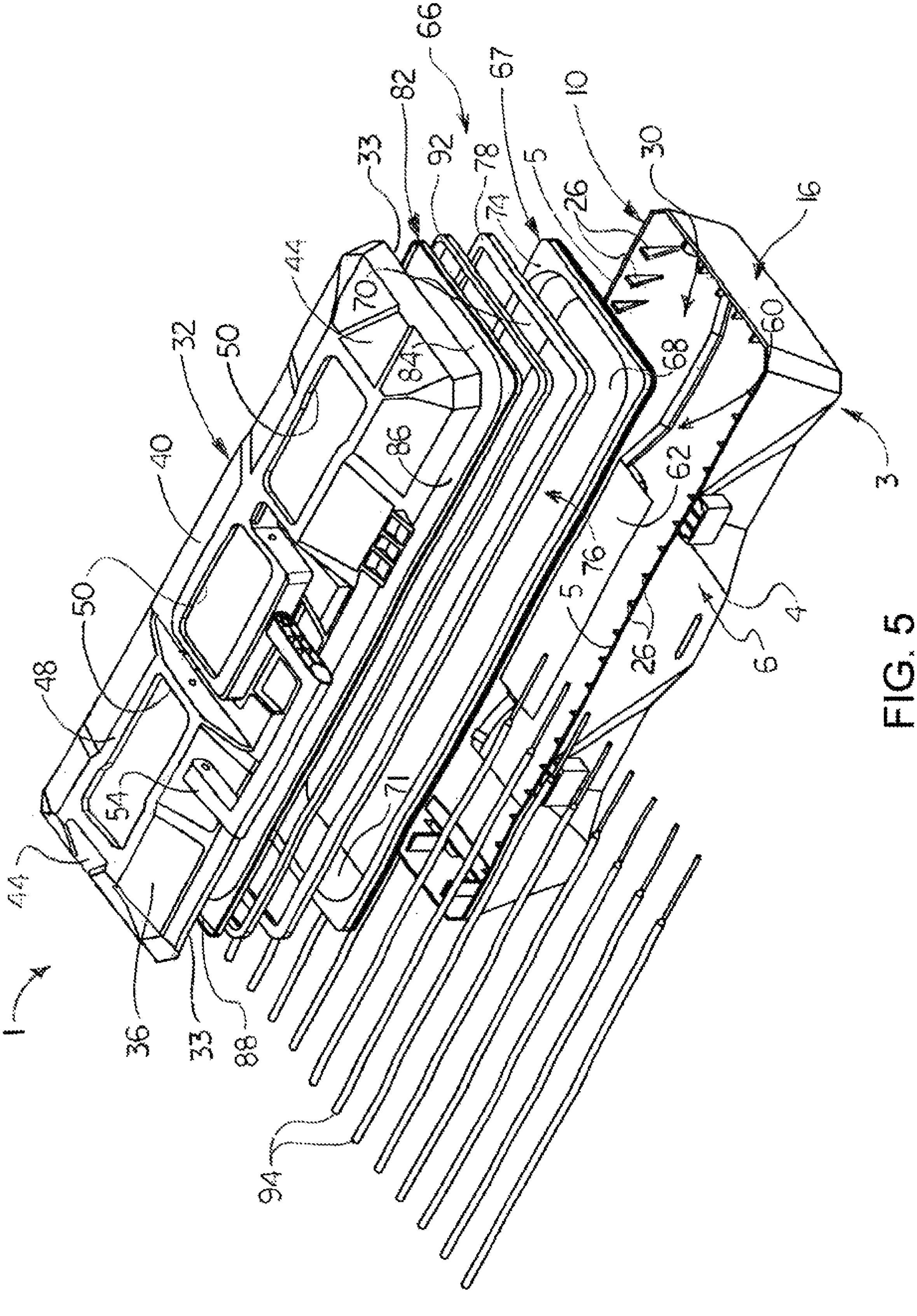
FIG. 5 is an exploded front perspective view of the illustrative electrode oven, with an electrode heating and drying system having an electrode container in the electrode oven and multiple welding electrodes deployed for placement in the electrode container for heating and drying of the electrodes in typical application of the electrode oven.
Figure 6:
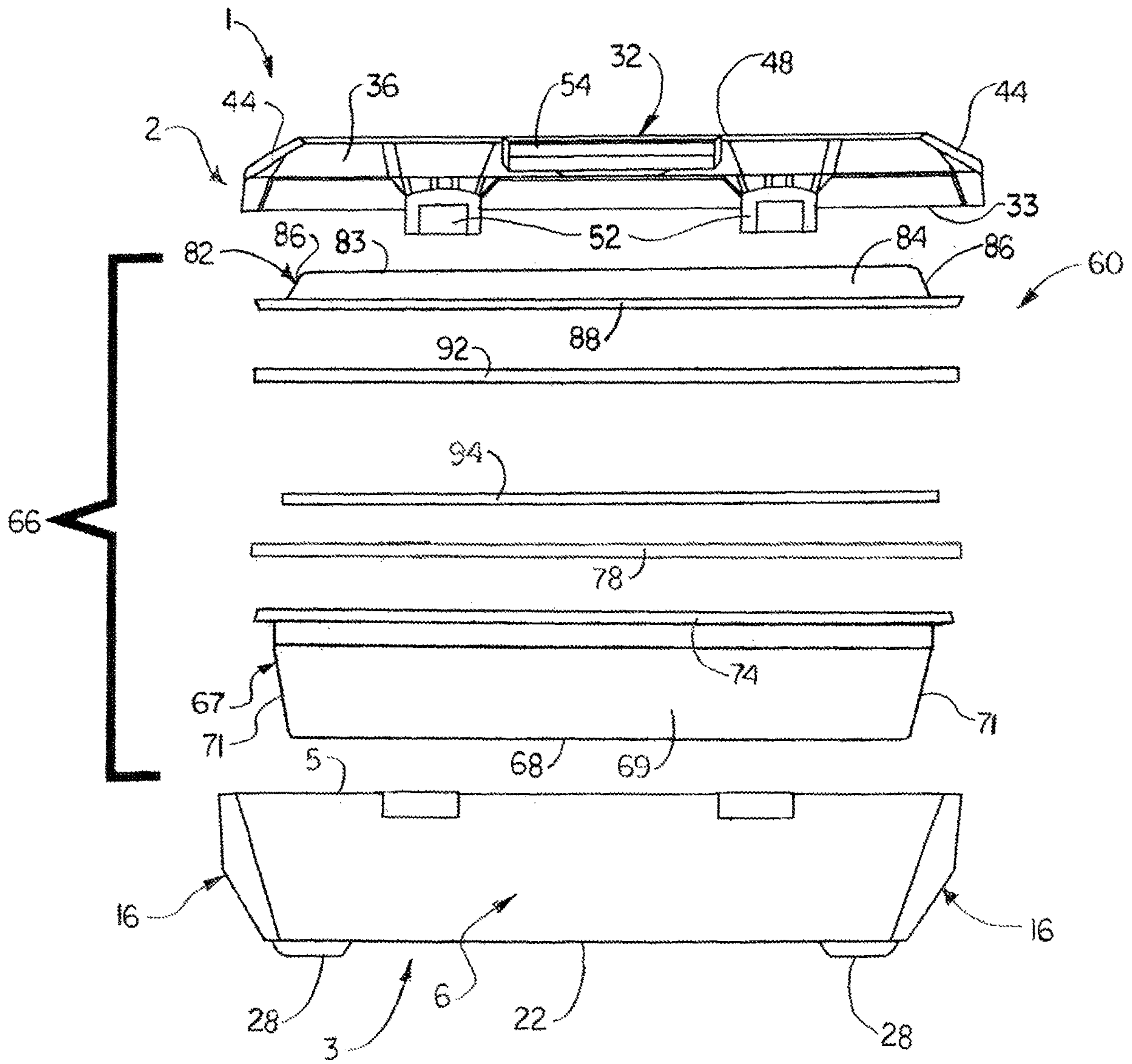
FIG. 6 is an exploded front view of the illustrative electrode oven.
Figure 7:
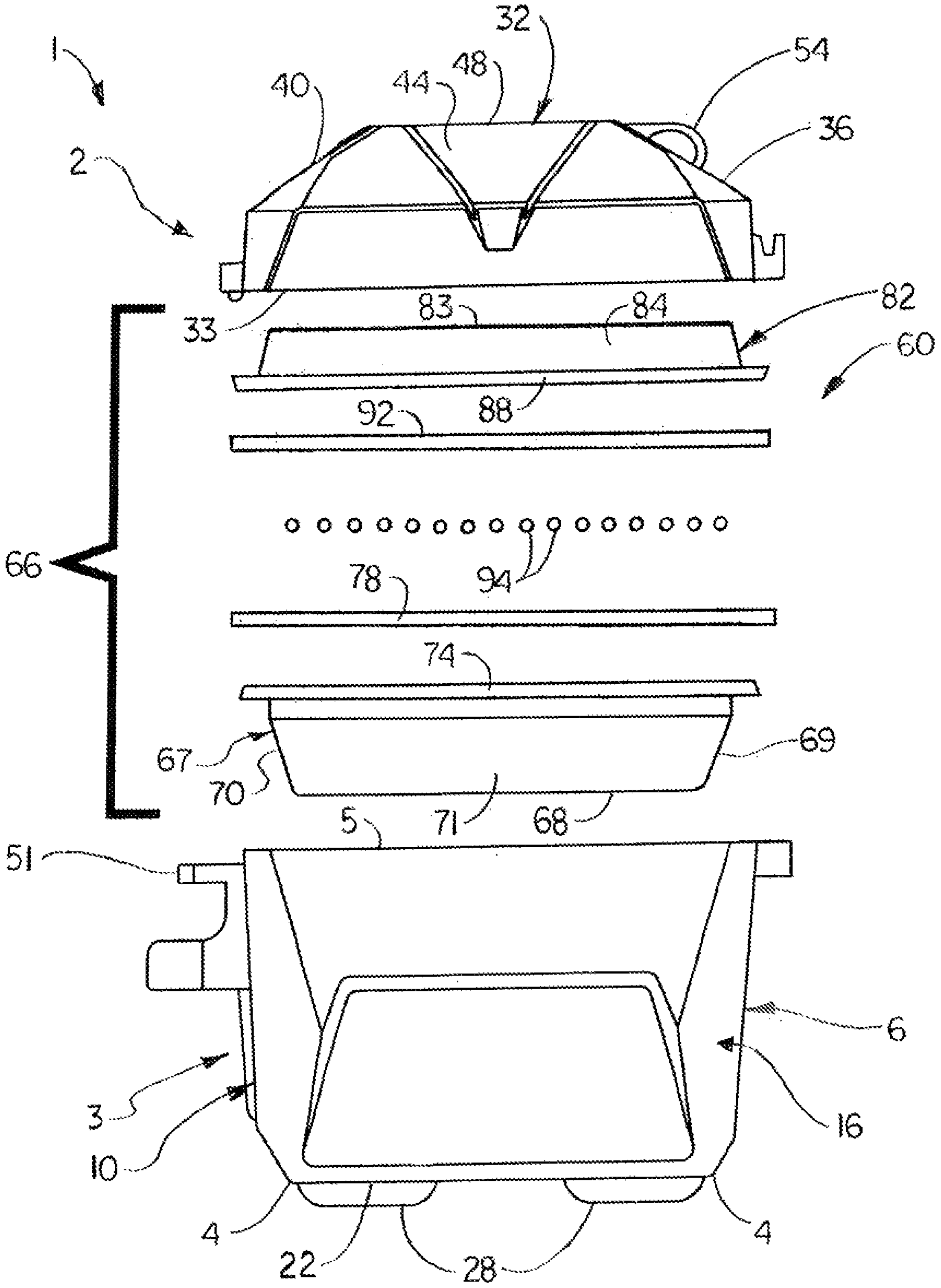
FIG. 7 is an exploded right-side view of the illustrative electrode oven.

As illustrated in FIGS. 5-7, at least one sealing gasket 78, 92 may be disposed between the container base 67 and the container cover 82 of the electrode container 66. The sealing gasket 78, 92 may be fabricated of a heat-resistant rubber, plastic, and/or other flexible elastomeric material and suitably sized and configured to sealingly engage the container base 67 and the container cover 87 to form a hermetically tight seal between the container base 67 and the container cover 87. In some embodiments, the sealing gasket 78, 92 may include a container base gasket 78 on the container base 67 and a container cover gasket 92 on the container cover 82. The container cover gasket 92 may be sized and configured to sealingly engage the container base gasket 78 to form an airtight seal in the closed container configuration of the electrode container 66.

The container base 67 and the container cover 82 of the electrode container 66 may be fabricated of a thermally conductive material. Non-limiting examples of such material may include aluminum, steel, and/or other metals, thermally conductive plastic and/or composite materials.

Figure 9:
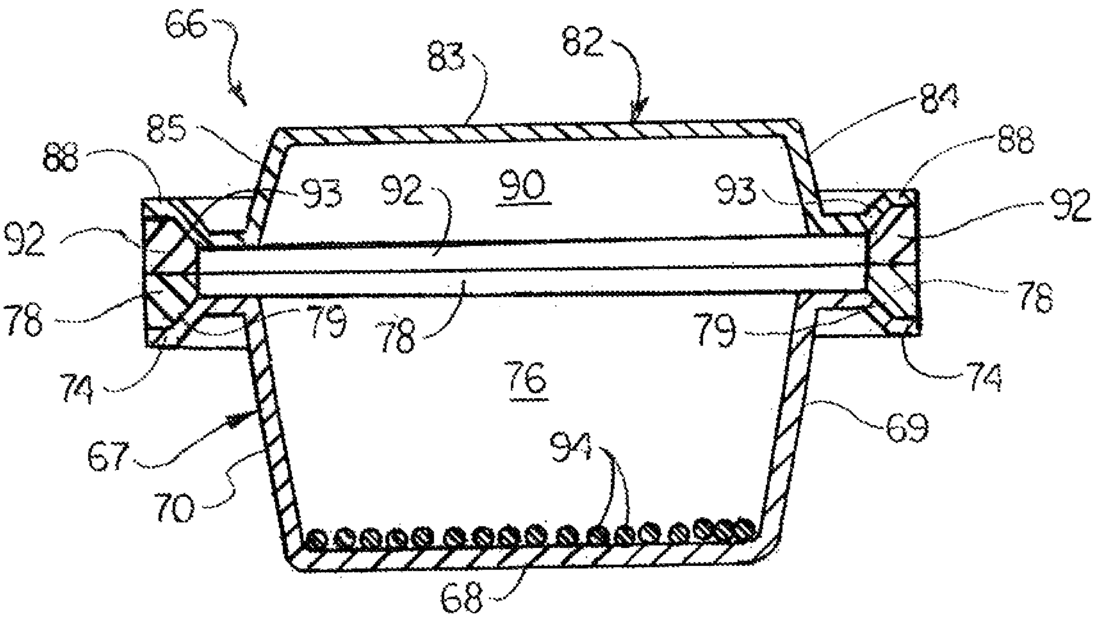
FIG. 9 is a cross-sectional view of a typical electrode container of the electrode heating and drying system of the electrode oven, with the electrodes in the electrode container.
Figure 11:
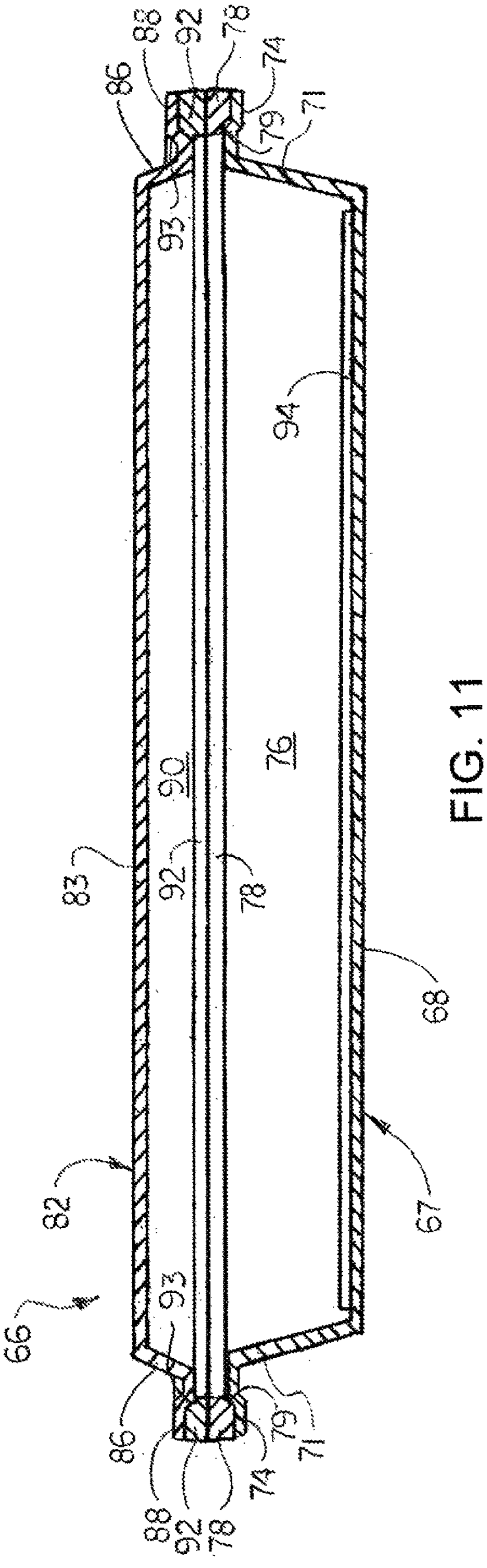
FIG. 11 is a longitudinal sectional view of the typical electrode container of the electrode heating and drying system of the electrode oven.

Each of the container base 67 and the container cover 82 of the electrode container 66 may be pan-shaped. Accordingly, the container base 67 may include a container base bottom 68. At least one container base wall 69, 70, 71 may extend from the container base bottom 68. A container base interior 76 may be formed by and between the container base bottom 68 and the container base walls 69, 70, 71. A container base flange 74 may extend outwardly from the container base wall 69, 70, 71. The container base flange 74 may be configured and contoured to uniformly and consistently engage the container base gasket 78 to form an airtight seal therewith, as illustrated in FIGS. 9 and 11 and will be hereinafter further described. In some embodiments, the container base walls 69, 70, 71 may angle outwardly from the container base bottom 68, as illustrated in FIGS. 9 and 11.

The container cover 82 of the electrode container 66 may include a container cover top 83. At least one container cover wall 84, 85, 86 may extend from the container cover top 83. A container cover flange 88 may extend outwardly from the container cover wall 84, 85, 86. A container cover interior 90 may be formed by and between the container cover top 83 and the container cover walls 84, 85, 86. The container cover flange 88 may be configured and contoured to uniformly and consistently engage the container cover gasket 92 to form an airtight seal therewith, as further illustrated in FIGS. 9 and 11. In some embodiments, the container cover walls 84, 85, 86 may angle outwardly from the container cover top 83, as illustrated in FIGS. 9 and 11.

In some embodiments, each of the container base 67 and the container cover 82 of the electrode container 66 may be elongated and rectangular. Accordingly, the container base bottom 68 of the container base 67 may be elongated. An elongated container base front wall 69 and an elongated container base rear wall 70 (FIG. 9) may extend from the container base bottom 68. The container base front wall 69 and the container base rear wall 70 may correspond positionally to the respective front base panel 6 and rear base panel 10 of the housing base 3. A pair of container base side walls 71 (FIG. 10) may extend from the container base bottom 68 between the container base front wall 69 and the container base rear wall 70. The container base flange 74 may extend outwardly from the container base front wall 69, the container base rear wall 70 and the container base side walls 71. As illustrated in FIGS. 8-11, the container base bottom 68 may be uniformly and consistently flat and planar and may have a uniform thickness from the container base front wall 69 to the container base rear wall 70 and from one container base side wall 71 to the other container base side wall 71.

The container cover 82 of the electrode container 66 may include an elongated container cover top 83. An elongated container cover front wall 84 and an elongated container cover rear wall 85 (FIG. 9) may extend from the container cover top 83. The container cover front wall 84 and the container cover rear wall 85 may correspond positionally to the respective container base front wall 69 and container base rear wall 70 of the container base 67. A pair of container cover side walls 86 (FIG. 10) may extend from the container cover top 83 between the container cover front wall 84 and the container cover rear wall 85. The container cover flange 88 may extend outwardly from the container cover front wall 84, the container cover rear wall 85 and the container cover side walls 86. As illustrated in FIGS. 8-11, the container cover top 83 may be uniformly and consistently flat and planar from the container cover front wall 84 to the container cover rear wall 85 and from one container cover side wall 86 to the other container cover side wall 86.

As further illustrated in FIGS. 9 and 11, in some embodiments, the container base gasket 78 may have a truncated interior container base gasket shoulder 79. The container base flange 74 of the container base 67 may be suitably sized and shaped or contoured to engage the base gasket shoulder 79 to enhance the airtight seal between the container base flange 74 and the container base gasket 78. In like manner, the container cover gasket 92 may have a truncated interior cover gasket shoulder 93. The container cover flange 88 of the container cover 82 may be suitably sized and shaped to engage the cover gasket shoulder 93 to enhance the airtight seal between the container cover flange 88 and the container cover gasket 92. In some embodiments, suitable mechanical fasteners and/or adhesive (not illustrated) may attach the container base gasket 78 to the container base flange 74 and the container cover gasket 92 to the container cover flange 88.

As illustrated in FIGS. 5, 8 and 10, in some embodiments, at least one electrode container support 26 may be provided in the housing base interior 30 of the housing base 3. The electrode container support or supports 26 may be configured to support the electrode container 67 in the housing interior 58 of the oven housing 2. For example and without limitation, as illustrated in FIGS. 8 and 10, the electrode container support or supports 26 may be configured to support the container base flange 74 of the container base 67 in the housing base interior 30, with the container cover 82 typically protruding into the lid interior 56 of the housing lid 32. As further illustrated in FIGS. 8 and 10, the electrode container support or supports 26 may be positioned and configured to support the electrode container 66 in a raised position with respect to the bottom base panel 22 of the housing base 3 and with respect to the heating element 62 of the electrode heating and drying system 60.

As illustrated in FIG. 8, the front base panel 6 of the housing base 3 may have an inner front base panel surface 8 which faces the housing base interior 30. The rear base panel 10 of the housing base 3 may have an inner rear base panel surface 12 which likewise faces the housing base interior 30. As illustrated in FIG. 10, each side base panel 16 of the housing base 3 may in like manner have an inner side base panel surface 18 which face the housing base interior 30. The electrode container support or supports 26 may extend from two or more of the inner front base panel surface 8, the rear base panel surface 11 and the inner side base panel surface or surfaces 18 into the housing base interior 30. For example and without limitation, in some embodiments, the electrode container support 26 may include a single continuous shelf which protrudes into the housing base interior 30 from at least two of the inner front base panel surface 8, the rear base panel surface 11 and the inner side base panel surfaces 18. As illustrated in FIG. 5, in other embodiments, multiple, spaced-apart, discrete electrode container supports 26 may protrude from two or more of the inner front base panel surface 8, the rear base panel surface 11 and the inner side base panel surfaces 18. The electrode container supports 26 may be recessed into the housing base interior 30 with respect to the upper base edge 5 of the housing base 3.

As illustrated in FIGS. 8 and 10, in some embodiments, the electrode container supports 26 may support the electrode container 66 in an elevated position in the housing base interior 30 of the housing base 3. Accordingly, the container base bottom 68 of the container base 67 may be above or spaced-apart with respect to the heating element 62. The heating element 62 may thus heat the container base bottom 68 of the container base 67 via convection or radiation. Alternatively, the heating element 62 may be disposed in contact with the container base bottom 68 such that the heating element 62 heat the container base bottom 68 via conduction. In either case, the heating area of the heating element 62 may substantially cover or correspond to the total area of the container base bottom 68 of the container base 67 to facilitate uniform and consistent heating of the container base bottom 68 and heating and drying of the welding electrodes 94 in the container base interior 76.

Figure 12:
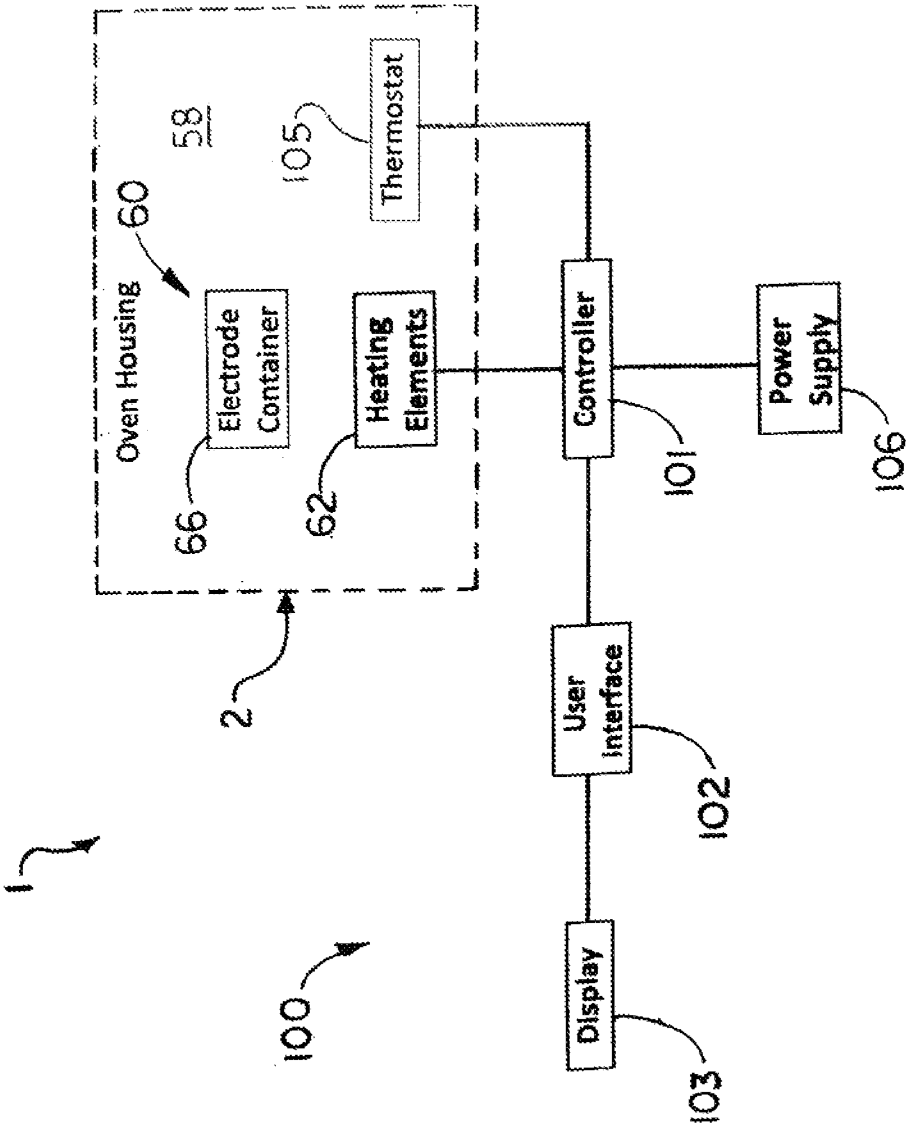
FIG. 12 is a functional block diagram of a typical oven control system suitable for controlling the electrode heating and drying system of the electrode oven.

As illustrated in FIG. 12, an oven control system 100 may operationally interface with the electrode heating and drying system 60 of the electrode oven 1. The oven control system 100 may include at least one controller 101. The controller 101 may include any computer, device, system, or combination thereof which are operational to implement the functions of the electrode oven 1. The controller 101 may include both hardware and software components necessary to implement the functions of the electrode heating and drying system 60. The heating element 62 of the electrode heating and drying system 60 may operationally interface with the controller 101.

At least one power supply 106 may interface with the controller 101. In some embodiments, the power supply 106 may include at least one battery or battery pack which may be disposable and/or rechargeable. In some embodiments, the power supply 106 may include a power cord, cable or interface which is plugged or hardwired into a standard 120-volt or 240-volt electrical outlet or dedicated electrical power source. Accordingly, the controller 101 may be configured to facilitate input of electrical current from the power supply 106 to the heating element 62 to heat the housing interior 58 of the oven housing 2 and the electrode container 66 to a preselected electrode heating temperature for heating and drying of the welding electrodes 94. The controller 101 may be configured to maintain the housing interior 58 at a preselected electrode maintenance or electrode storage temperature to maintain the welding electrodes 94 in the dry and heated condition prior to use of the welding electrodes 94.

At least one user interface 102 may functionally interface with the controller 101. The user interface 102 may include at least one touchscreen display, button, dial, knob, switch, and/or other control feature or features necessary to facilitate operation of the electrode heating and drying system 60. The user interface 102 may be operable to facilitate the user-selected electrode heating temperature and electrode storage temperature of the oven housing 2 as well as timer setting functions to facilitate operation of the electrode heating and drying system 60 at the electrode storage temperature for a selected electrode heating time, for example and without limitation.

The user interface 102 may have at least one display 103. The display 103 may be configured to present operational data such as the measured internal temperature of the oven housing 2 as well as the electrode heating temperature and the electrode storage temperature, for example and without limitation.

In some embodiments, a thermostat 105 may operationally interface with the controller 101. The thermostat 105 may be suitably configured and positioned to measure the temperature of the housing interior 58 of the oven housing 2 and/or the interior temperature of the electrode container 66 and transmit the measured temperature data to the controller 101. The controller 101 may be configured to present the measured temperature on the display 103. Responsive to feedback from the thermostat 105, the controller 101 may be configured to control input of electrical current to the heating element 62 to maintain the temperature of the housing interior 58 and/or the interior temperature of the electrode container 66 at the desired preselected electrode heating temperature or electrode storage temperature. The controller 101 may be configured to terminate further input of electrical current to the heating element 62 upon elapse of the electrode heating time.

In typical application of the electrode oven 1, at least one welding electrode 94 may be placed in the electrode container 66 and the electrode container 66 placed in the oven housing 2. The oven control system 100 may be operated to heat the housing interior 58 of the oven housing 2 and/or the interior of the electrode container 66 to the selected electrode heating temperature to heat and dry the welding electrodes 94. The controller 101 may additionally be programmed to maintain the housing interior 58 and/or the interior of the electrode container 66 at a selected electrode storage temperature, which may be the same as or different than the electrode heating temperature, typically for a selected electrode storage heating time. In some applications, typical parameters for heating and drying of the welding electrodes 94 may include an electrode heating time of 2 hours at an electrode heating temperature of 245 degrees C. plus or minus 15 degrees C. A typical electrode storage temperature may be 28 degrees C. to 130 degrees C. above ambient temperature.

The oven housing 2 may be opened typically by unlatching the lid latches 52 and deploying the housing lid 32 from the closed housing configuration to the open housing configuration on the lid hinges 51. The electrode container 66 of the electrode heating and drying system 60 may be deployed from the closed container configuration to the open container configuration typically by lifting, raising, or pivoting the container cover 82 from the container base 67. The welding electrodes 94 may be placed flat on the container base bottom 68 in the container base interior 76 of the container base 67, with the longitudinal axes of the welding electrodes 94 typically oriented parallel to the longitudinal axis of the electrode container 66. In typical application, multiple welding electrodes 94 may be placed adjacent to each other on the container base bottom 68 of the container base 67 in a single layer. Alternatively, the welding electrodes 94 may be stacked on top of each other in multiple layers until the container base 67 or the electrode container 66 is substantially filled. The container cover 82 may then be replaced on the container base 67 with the container cover gasket 92 on the container cover flange 88 of the container cover 82 sealingly engaging the container base gasket 78 on the container base flange 74 of the container base 67.

In some applications, the electrode container 66 may first be lifted from the electrode container support or supports 26 and removed from the housing base interior 30 of the housing base 3 and the container cover 82 then lifted or pivoted from the container base 67 outside the oven housing 2. The welding electrodes 94 may be placed in the container base 67, the container cover 82 replaced on the container base 67 and the closed electrode container 66 with the welding electrodes 94 contained therein placed back in the housing base interior 30. The housing lid 32 may then be deployed back to the closed housing configuration on the housing base 3 and typically secured using the lid latches 52.

The desired electrode heating temperature may be programmed into the controller 101 of the oven control system 100 typically using the user interface 102. Additional operational parameters such as the electrode storage temperature and the electrode heating time, for example and without limitation, may in like manner be programmed into the controller 101. The controller 101 may present the inputted parameters on the display 103. As the programmed or initiated controller 101 enables flow of electrical current from the power supply 106 to the heating element 62, the controller 101 may indicate the temperature of the housing interior 58 and/or the interior of the electrode container 66, typically measured by the thermostat 105, in real time on the display 103.

The heating element 62, energized by the controller 101 via the power supply 106, may heat the housing interior 58 and/or the interior of the electrode container 66 to the set electrode heating temperature. It will be appreciated by those skilled in the art that the typically pan-shaped design of the container base 67 and the container cover 82 of the electrode container 66, as well as the typically flat and uniformly and consistently planar and uniform thickness contour of the container base bottom 68 of the container base 67, may facilitate uniform heating and drying of each welding electrode 94 along its length. Consequently, moisture may be released from each welding electrode 94 such that the welding electrodes 94 are heated and dried to an optimum degree for welding. The controller 101 may continue to maintain the housing interior 58 of the oven housing 2 and/or the interior of the electrode container 66 at the selected electrode storage temperature and dryness until the welding electrodes 94 are to be used for welding. In some applications, the controller 101 may terminate further flow of electrical current from the power supply 106 to the heating element 62 after the electrode heating or storage time has elapsed.

The heated and dried welding electrodes 94 may be removed from the electrode container 66 for use typically by initially deploying the housing lid 32 from the closed lid configuration to the open lid configuration on the housing base 3. The container cover 82 may next be deployed from the closed container configuration to the open container configuration on the container base 67 of the electrode container 66. One or more of the heated and dried welding electrodes 94 may be removed from the container base interior 76 of the container base 67 for use in welding, typically in the conventional manner. It will be appreciated by those skilled in the art that the welding electrodes 94, upon removal from the electrode container 66, are in a sufficiently heated and dried condition to achieve optimum results in the welding operation.

Figure 13:
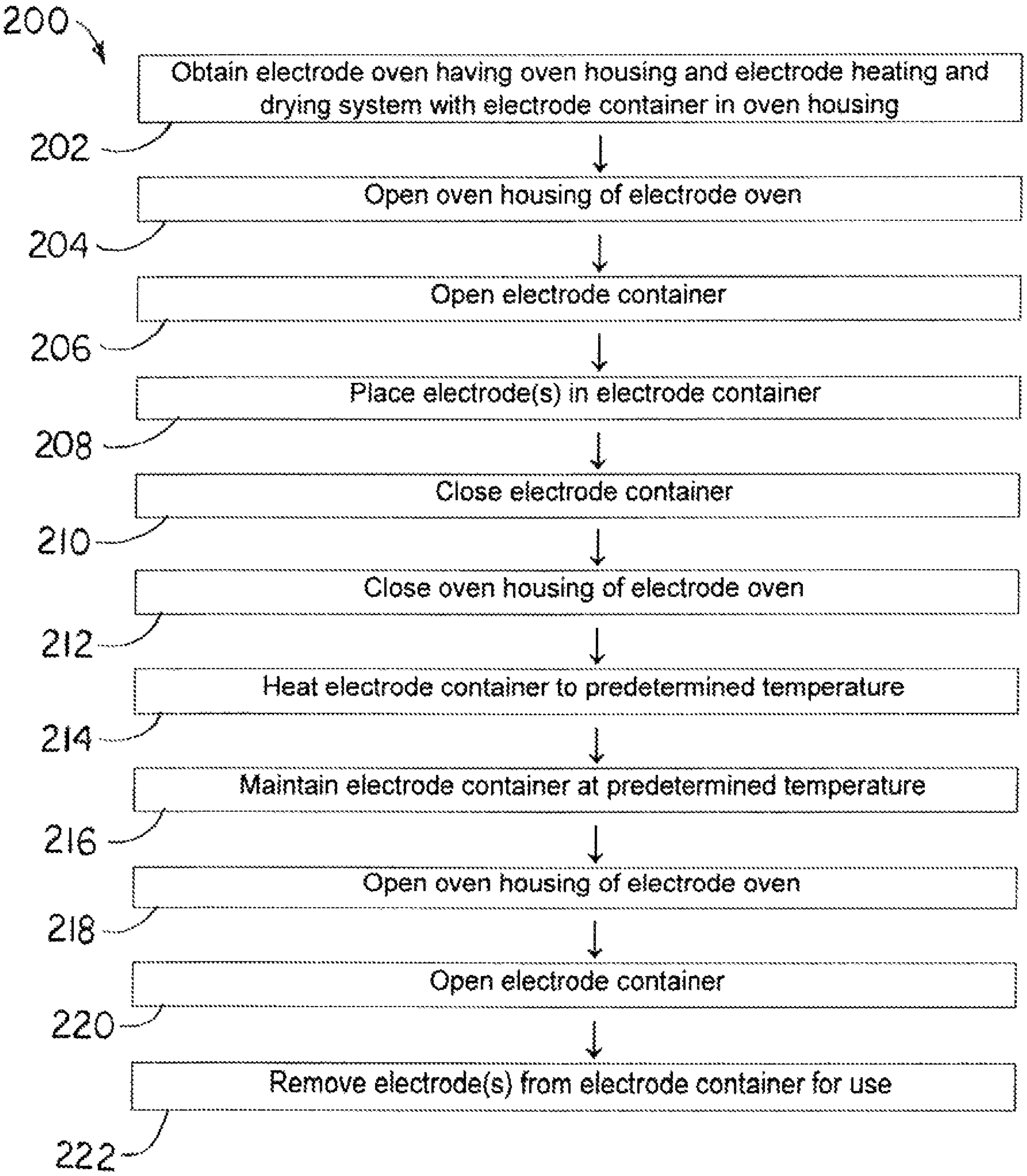
FIG. 13 is a flow diagram of an illustrative embodiment of the electrode heating and drying methods.

Referring next to FIG. 13 of the drawings, an illustrative embodiment of the electrode heating and drying methods is generally indicated by reference numeral 200. At Step 202, an electrode oven may be obtained. The electrode oven may have an oven housing and an electrode heating and drying system in the oven housing. The electrode heating and drying system may have an electrode container.

At Step 204, the oven housing of the electrode oven may be deployed from the closed oven configuration to the open oven configuration.

At Step 206, the electrode container of the electrode heating and drying system may be deployed from the closed container configuration to the open container configuration.

At Step 208, one or more welding electrodes to be heated and dried prior to use may be placed in the electrode container.

At Step 210, the electrode container with the welding electrodes therein may be deployed from the open container configuration to the closed container configuration.

At Step 212, the oven housing of the electrode oven may be deployed from the open housing configuration to the closed housing configuration.

At Step 214, the housing interior and/or the interior of the electrode container may be heated to a predetermined electrode heating temperature.

At Step 216, the housing interior and/or the interior of the electrode container may be maintained at a preselected electrode maintenance or storage temperature.

At Step 218, the oven housing of the electrode oven may be deployed from the closed housing configuration to the open housing configuration.

At Step 220, the electrode container may be deployed from the closed container configuration to the open container configuration.

At Step 222, the electrodes may be removed from the electrode container for use.

While certain illustrative embodiments of the disclosure have been described above, it will be recognized and understood that various modifications can be made to the embodiments and the appended claims are intended to cover all such modifications which may fall within the spirit and scope of the disclosure.

The invention claimed is:

1. An electrode oven suitable for heating and drying welding electrodes, comprising:

an oven housing deployable in open and closed oven configurations: and an electrode heating and drying system in the oven housing, the electrode heating and drying system comprising:

a hermetically sealable electrode container deployable in open and closed container configurations, the electrode container sized and configured to contain at least one welding electrode, the electrode container comprising:

a container base sized and configured to contain the at least one welding electrode, the container base comprising a container base bottom uniformly flat and planar and having a uniform thickness along its length and width, whereby the flat and uniformly and consistently planar and uniform thickness contour of the container base bottom of the container base facilitate uniform heating and drying of each welding electrode along its length; and an openable container cover on the container base; and at least one heating element in the oven housing, the at least one heating element disposed in heat-transferring relationship to the electrode container and operable to heat the electrode container.

2. The electrode oven of claim 1 wherein the oven housing comprises a housing base and a housing lid openable on the housing base.

3. The electrode oven of claim 2 wherein the housing lid is pivotally attached to the housing base.

4. The electrode oven of claim 1 wherein the container cover is completely removable from the container base in deployment of the electrode container from the closed container configuration to the open container configuration.

5. The electrode oven of claim 1 further comprising at least one sealing gasket between the container base and the container cover of the electrode container.

6. The electrode oven of claim 5 wherein the at least one sealing gasket comprises a container base gasket on the container base and a container cover gasket on the container cover, the container cover gasket sized and configured to sealingly engage the container base gasket in the closed container configuration of the electrode container.

7. The electrode oven of claim 1 wherein each of the oven housing and the electrode container is elongated and rectangular.

8. An electrode oven suitable for heating and drying welding electrodes, comprising:
- an oven housing deployable in open and closed oven configurations; and
- an electrode heating and drying system in the oven housing, the electrode heating and drying system comprising:
  - a sealable electrode container comprising:
    - a container base sized and configured to contain at least one welding electrode, the container base comprising a container base bottom uniformly flat and planar and having a uniform thickness along its length and width, whereby the flat and uniformly and consistently planar and uniform thickness contour of the container base bottom of the container base facilitate uniform heating and drying of each welding electrode along its length;
    - a container base gasket on the container base;
    - a container cover deployable in open and closed container configurations on the container base, the container cover comprising a container cover top uniformly flat and planar and having a uniform thickness along its length and width;
    - a container cover gasket on the container cover, the container cover gasket configured to sealingly engage the container base gasket in the closed container configuration; and
    - the container base and the container cover comprising a thermally conductive material; and
  - at least one heating element in the oven housing, the at least one heating element disposed in heat-transferring relationship to the container base of the electrode container and operable to heat the electrode container.

9. The electrode oven of claim 8 wherein the oven housing comprises a housing base and a housing lid openable on the housing base.

10. The electrode oven of claim 9 wherein the housing lid is pivotally attached to the housing base and openable on the housing base along a horizontal lid axis.

11. The electrode oven of claim 8 wherein the container cover is completely removable from the container base in deployment of the electrode container from the closed container configuration to the open container configuration.

12. The electrode oven of claim 8 wherein each of the container base and the container cover of the electrode container is pan-shaped.

13. The electrode oven of claim 8 wherein the container base of the electrode container comprises at least one container base wall extending from the container base bottom and a container base flange extending outwardly from the at least one container base wall, the container base flange configured to engage the container base gasket.

14. The electrode oven of claim 13 wherein the container cover of the electrode container comprises at least one container cover wall extending from the container cover top and a container cover flange extending outwardly from the at least one container cover wall, the container cover flange configured to engage the container cover gasket.

15. An electrode oven suitable for heating and drying welding electrodes, comprising:
- an oven housing comprising:
  - an elongated housing base comprising an upper base edge;
  - an elongated housing lid openable on the housing base, the housing lid deployable in open and closed oven configurations and comprising a lid edge configured to mate with the upper base edge of the housing base when the housing lid is in the closed oven configuration; and
  - at least one electrode container support in the housing base; and
- an electrode heating and drying system in the oven housing, the electrode heating and drying system comprising:
  - a hermetically sealable electrode container comprising:
    - a container base supported by the at least one electrode container support in the housing base of the oven housing, the container base sized and configured to contain at least one welding electrode, the container base comprising:
      - a container base bottom;
      - a pair of container base side walls, a container base front wall and a container base rear wall extending from the container base bottom, the container base bottom uniformly and consistently flat and planar and having a uniform thickness from the container base front wall to the container base rear wall and from one of the container base side walls to the other of the container base side walls, whereby the flat and uniformly and consistently planar and uniform thickness contour of the container base bottom of the container base facilitate uniform heating and drying of each welding electrode along its length; and
      - a container base flange extending outwardly from the at least one container base wall;
    - a container base gasket engaging the container base flange of the container base;
    - an openable container cover deployable in open and closed container configurations on the container base, the container cover sealingly engaging the container base in the closed container configuration, the electrode container deployable from the closed container configuration to the open container configuration by lifting, raising, or pivoting the container cover from the container base and comprising:
      - a container cover top;

a pair of container cover side walls, a container cover front wall and a container cover rear wall extending from the container cover top, the container cover top uniformly and consistently flat and planar and having a uniform thickness from the container cover front wall to the container cover rear wall and from one of the container cover side walls to the other of the container cover side walls; and a container cover flange extending outwardly from the at least one container cover wall;

a container cover gasket engaging the container flange of the container cover, the container cover gasket configured to sealingly engage the container base gasket of the container base in the closed container configuration;

the container base and the container cover comprising a thermally conductive material; and wherein the electrode container is liftable from the housing base of the oven housing in the open oven configuration;

at least one heating element in the housing base of the oven housing, the at least one heating element disposed in heat-transferring relationship to the container base of the electrode container and operable to heat the electrode container; and an oven control system operably interfacing with the at least one heating element of the electrode heating and drying system, the oven control system comprising at least one computer, device, system, or combination thereof.

16. The electrode oven of claim 15 wherein the housing lid is pivotally attached to the housing base and openable on the housing base along a horizontal lid axis.

17. The electrode oven of claim 15 wherein the container cover is completely removable from the container base in deployment of the electrode container from the closed container configuration to the open container configuration.

18. The electrode oven of claim 15 wherein the oven control system comprises a controller operably interfacing with the at least one heating element and a user interface and a power supply interfacing with the controller.

19. The electrode oven of claim 18 further comprising a thermostat interfacing with the controller.

* * * * *